US008479121B2

(12) United States Patent
Maruyama et al.

(10) Patent No.: US 8,479,121 B2
(45) Date of Patent: Jul. 2, 2013

(54) SIGN OBJECT PRESENTATION SYSTEM

(75) Inventors: Tomoyasu Maruyama, Tokyo (JP); Naoki Shirai, Tama (JP)

(73) Assignee: Kokusai Kogyo Co., Ltd., Tokyo (JP)

( * ) Notice: Subject to any disclaimer, the term of this patent is extended or adjusted under 35 U.S.C. 154(b) by 807 days.

(21) Appl. No.: 11/874,353

(22) Filed: Oct. 18, 2007

(65) Prior Publication Data

US 2008/0098633 A1 May 1, 2008

(30) Foreign Application Priority Data

Oct. 19, 2006 (JP) ................................. 2006-309669

(51) Int. Cl.
*G06F 3/048* (2006.01)
*G06F 3/00* (2006.01)

(52) U.S. Cl.
USPC ............ 715/850; 715/764; 715/848; 715/849

(58) Field of Classification Search
USPC ................. 715/764, 778, 809, 848, 784, 850, 715/849; 345/473, 419, 428; 701/211
See application file for complete search history.

(56) References Cited

U.S. PATENT DOCUMENTS

| | | | | |
|---|---|---|---|---|
| 5,689,669 | A * | 11/1997 | Lynch et al. | 715/848 |
| 6,002,853 | A * | 12/1999 | de Hond | 709/219 |
| 6,271,843 | B1 * | 8/2001 | Lection et al. | 715/848 |
| 6,360,168 | B1 * | 3/2002 | Shimabara | 701/211 |
| 6,362,817 | B1 * | 3/2002 | Powers et al. | 345/419 |
| 6,414,679 | B1 * | 7/2002 | Miodonski et al. | 345/420 |
| 6,570,563 | B1 * | 5/2003 | Honda | 345/419 |
| 6,573,903 | B2 * | 6/2003 | Gantt | 345/619 |
| 6,590,593 | B1 * | 7/2003 | Robertson et al. | 715/782 |
| 6,621,508 | B1 * | 9/2003 | Shiraishi et al. | 715/810 |
| 6,690,393 | B2 * | 2/2004 | Heron et al. | 715/757 |
| 6,961,055 | B2 * | 11/2005 | Doak et al. | 345/419 |
| 7,076,741 | B2 * | 7/2006 | Miyaki | 715/837 |
| 7,414,629 | B2 * | 8/2008 | Santodomingo et al. | 345/582 |
| 7,467,356 | B2 * | 12/2008 | Gettman et al. | 715/850 |
| 7,653,877 | B2 * | 1/2010 | Matsuda | 715/706 |
| 7,746,343 | B1 * | 6/2010 | Charaniya et al. | 345/428 |
| 2001/0018667 | A1 * | 8/2001 | Kim | 705/14 |
| 2002/0095463 | A1 * | 7/2002 | Matsuda | 709/205 |
| 2005/0093719 | A1 * | 5/2005 | Okamoto et al. | 340/995.1 |
| 2005/0128212 | A1 * | 6/2005 | Edecker et al. | 345/582 |
| 2008/0235570 | A1 * | 9/2008 | Sawada et al. | 715/230 |

FOREIGN PATENT DOCUMENTS

| | | | |
|---|---|---|---|
| JP | 06-138819 | | 5/1994 |
| JP | 2000221876 | A | 8/2000 |
| JP | 2001-034160 | | 2/2001 |
| JP | 20011280980 | A | 10/2001 |
| JP | 2003337040 | A * | 11/2003 |
| JP | 2004138581 | A | 5/2004 |
| JP | 2005-149409 | | 6/2005 |

* cited by examiner

*Primary Examiner* — Nicholas Augustine
(74) *Attorney, Agent, or Firm* — Lucas & Mercanti, LLP

(57) ABSTRACT

The present Invention provides a sign object presentation system which selects object data for a three-dimensional object, linking the object data with a plurality of sign data for a sign object, and selects proper sign data out of the plurality of sign data based on presentation information for the object data; and displays the three-dimensional object with the selected sign data located at a predetermined position of the three dimensional object.

5 Claims, 2 Drawing Sheets

SIGN OBJECT PRESENTATION SYSTEM

FIELD OF THE INVENTION

The present invention relates to a presentation system and/or the presentation device thereof to display sign object supplement to a three-dimensional object when the three-dimensional object is displayed. More specifically, the present invention relates to a presentation system of sign objects improved for easy viewing and a presentation device based on this presentation system.

BACKGROUND OF THE INVENTION

In recent years, three-dimensional displays (3-D displays) are being provided for car navigation, portable navigation, navigation for portable telephones, and the like. Various improvements have been made to ease identification of the position of a viewer, the direction of motion, and the like.

In the case of 3-D displays, the use of photos for portions of the display requires time and labor for preparation. In addition to the high expense of data creation, there is greater data volume, increased use of storage memory, and increased processing time, and greater data volume, increased use of storage memory, and increased processing time, and therefore, the use of photos is usually not desired in the display. In the cost-competitive field of navigation systems, there is widespread use of computer graphic (CG) image data to allow simple and inexpensive processing.

With CG images, innovations have been made to provide as much photorealism as possible, and these innovations are applied not only to three-dimensional objects for architectural objects such as buildings but also to sign objects such as displays. As a result, these sign objects are in some cases complex, resulting in the overall image giving an impression different from that of the actual location. Alternatively, there may be too fine, complex overlapping of images, which reduce the ease of viewing.

In the present invention, sign objects refer to objects for advertisements, building names, street names, store names, and the like, as well as objects of signs for textures, pictures, colors, designs and the like for traffic signs and the like, either singly or in combination. Three-dimensional objects refer to objects in which sign objects have been removed from a 3-D display screen, e.g., buildings, bridges, streets, and rivers. Various improvements in 3-D screen displays have been attempted. For example, Japanese Laid-Open Patent Publication Number 2001-34160 (Patent Document 1) describes an improvement in the display of sign objects to avoid overlapping displays in these sign objects.

SUMMARY OF THE INVENTION

Conventional 3-D screen display methods use sign objects formed from photographs or photorealistic images. If perspective is to be displayed, distance information about the sign objects is used to calculate display size. Furthermore, 3-D transformations are performed based on the viewing direction. For example, data can be transformed and displayed to provide an oblique display. As described above, providing a complex display for the viewer can present a problem in that the display becomes more difficult to view or search. Thus, there is a need for an improvement that addresses this problem. Furthermore, there is a need to reduce data volume, increase display speed, and the like.

In the present invention, claim 1 provides a sign object presentation system including: means for selecting object data for a three-dimensional object, linking the object data with a plurality of sign data for a sign object, and selecting proper sign data out of the plurality of sign data based on presentation information for the object data; and means for displaying the three-dimensional object with the selected sign data located at a predetermined position of the three-dimensional object.

In the present invention, for a single three-dimensional object, multiple sets of data (sign data) are prepared for a sign object associated with the three-dimensional object. Multiple sets of sign data are used for at least one frequently used three-dimensional object.

For example, a three-dimensional object such as a building or monument located at a corner of a busy intersection will have a high probability of being displayed frequently in the 3-D display of a navigation system. Thus, for at least this three-dimensional object, multiple sets of sign data are prepared for sign objects, e.g., advertisements or displays, associated with the three-dimensional object.

For this sign object, multiple sets of sign data that simplify and capture the characteristics of the sign object to make viewer identification possible are prepared. For example, if the sign object includes the name of a specific, notable bank, sets of sign data can be prepared so that one sign data can display the full name of the bank, another can display the simplified name of the bank, another can display a corporate color, and another can display the logo of the bank.

In this manner, multiple sets of sign data can be associated and links can be set up for, e.g., a bank (three-dimensional object) located at a busy intersection. Then, suitable sign data can be selected (selection of predetermined sign data) based on display information for when the bank is displayed (e.g., the size of the building and viewing direction and/or information about overlapping of sign objects such as business signs.

ADVANTAGES OF THE INVENTION

The selected sign data described above is attached (joined at a predetermined position) to an easily viewable position on the building and displayed. Thus, while the display is not photorealistic as in the conventional technology, adequately identifiable information is displayed so that it is easily viewed by the viewer. Also, since the data volume can be small, processing is easier and display speed is improved. Furthermore, labor required for preparation of the data is reduced, thus decreasing expenses. Furthermore, for identical banks, the same sign data can be used for bank buildings in other areas. This provides a significant reduction in data volume and makes it possible to reduce storage capacity. Various other advantages will be apparent in the description below.

PREFERRED EMBODIMENTS OF THE INVENTION

As described above, in addition to the description of the preferred embodiment of claim 1, another preferred embodiment is described in claim 2, which provides a sign object presentation system according to claim 1 further including means for keeping the selected sign data at an orientation facing forward. As described in Patent Document 1, in 3-D image display, it is natural for sign objects to undergo three-dimensional transformation, together with three-dimensional objects, based on the viewing direction. However, this tends to make identification difficult in oblique displays. In this embodiment, data is displayed facing forward at least within certain conditions and preferably at all times.

According to the present invention, facing forward refers to displaying the sign object surface perpendicular or roughly perpendicular to the viewing direction of the navigation system display. In some cases, this may appear unnatural, but this display method makes it possible to give priority to ease of identification while modifying scaling or the like to reduce unnatural appearances. As a result, ease of identification is improved while the time required for performing three-dimensional transformations of sign objects can be reduced.

According to another preferred embodiment, claim 3 provides a sign object presentation system according to claim 1 or claim 2 further including means for selecting the sign object based on entered search information and selecting the predetermined sign data out of the plurality of sign data based on display information for the three-dimensional object data to which and on which the sign object is linked and displayed. For example, if "bank" is entered as a search term, entries that match the bank query are selected out of the sign objects and the three-dimensional objects linked to these are selected. Then, based on GPS position information, information of the direction of motion of the viewer, and the like, the positions of the three-dimensional objects that are close by are displayed on a two-dimensional map. Then, based on selection information from the viewer, guiding information for the viewer is provided in a three-dimensional display. Of course, the selection is made for just one three-dimensional object. It would also be possible to go to the three-dimensional display without provided the two-dimensional map display if there are no options for the viewer to select.

According to another preferable embodiment, claim 4 provides a sign object presentation system according to any one of claim 1 through claim 3 further including means for displaying without overlapping when there is a plurality of the three-dimensional objects or a plurality of the sign data displayed in association with the three-dimensional object or a plurality of the three-dimensional objects and the plurality of sign data would be displayed in an overlapping manner. Foe example, besides using the method for preventing overlapping described in Patent Document 1, it would also be possible to take display size into consideration when selecting a data set for a sign object. Then, a preferable combination of sign objects can be selected by recalculating how overlapping can take place, thus preventing overlapping in the display.

Furthermore, in the case of the overlapping described above, a selection method can be used in which sign objects of three-dimensional objects that can be identified without the display of a sign are omitted from the display depending on overlapping conditions. In such cases, information for prioritizing sign object combinations can be entered ahead of time.

Another preferred embodiment provides a display device that implements the systems from the embodiments described above. Examples of such display devices include car navigation devices, portable navigation devices, and more preferably, portable telephones. Even more preferably, the systems according to the present invention can be implemented by a service provider or map display provider for portable telephones or portable PC terminals: thus reducing the load on the terminals.

DETAILED DESCRIPTION OF THE DRAWINGS

Figure 1:
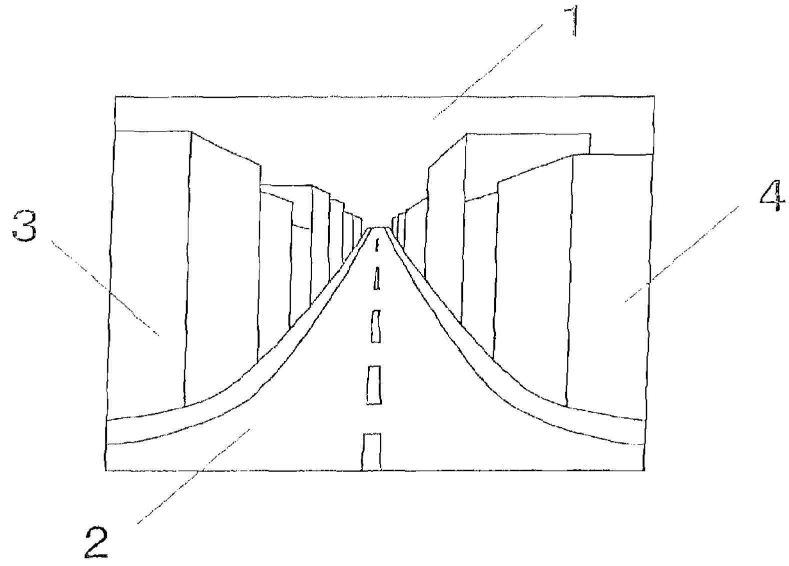
FIG. 1 illustrates a three-dimensional display.

The present invention will be described, with references to the drawings, in further detail with examples. FIG. 1 is a simplified drawing of a screen 1 showing a three-dimensional display. In FIG. 1, three-dimensional objects 3 and 4 are shown in a simplified manner. There is also shown a street 2, another three-dimensional object.

Figure 2:
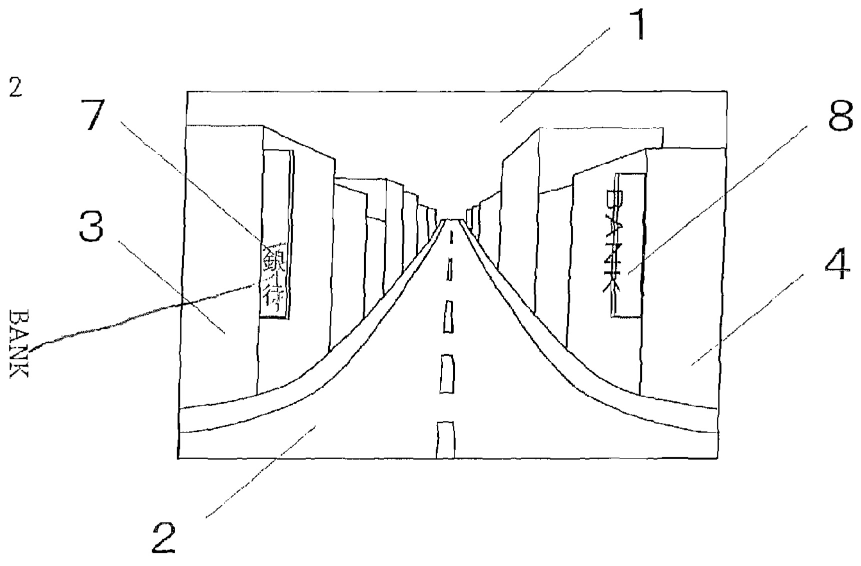
FIG. 2 illustrates a three-dimensional display according to the present invention.

FIG. 2 is a simplified drawing of an example of the present invention in which sign objects 7 and 8 are affixed to the three-dimensional objects 3 and 4 respectively from the screen 1 from FIG. 1. The sign objects 7 and 8 display data selected from multiple units of sign data. The addition of the sign data display adds realism and provides adequate ease of identification.

Figure 3:
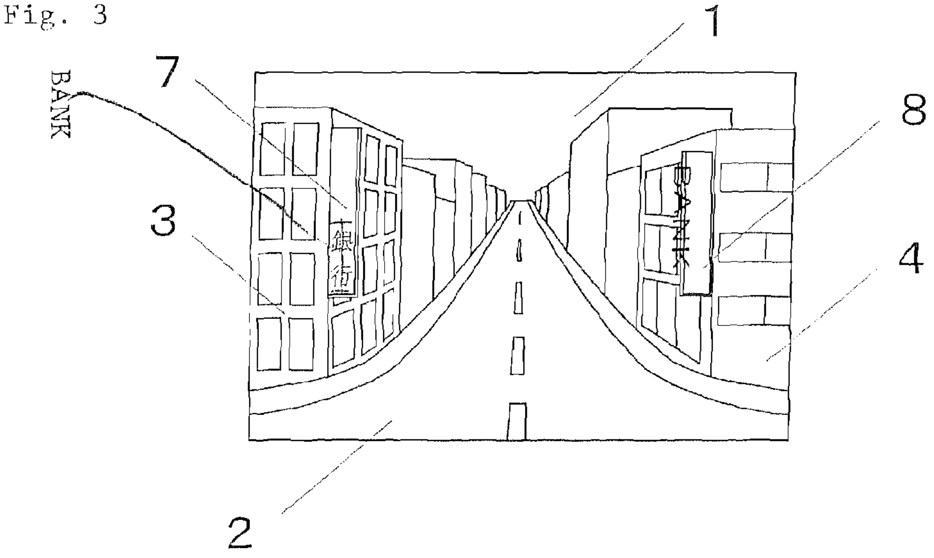
FIG. 3 illustrates another example of a three-dimensional display according to the present Invention.

In FIG. 3, the forwardmost three-dimensional objects, such as the three-dimensional objects 3 and 4 from FIG. 2, are displayed in a textured manner. This illustrates another example of the present invention, in which further realism is provided. Even if textures are not applied to everything, the perception of added realism and photorealism is possible through the selective use of texturing on three-dimensional objects that take up a large area and/or are prominent. Thus, the object can be achieved through the processing of a small amount of data. This also solves the problem in photorealistic CG displays associated with difficulty in identification due to excessive complexity.

Figure 4:
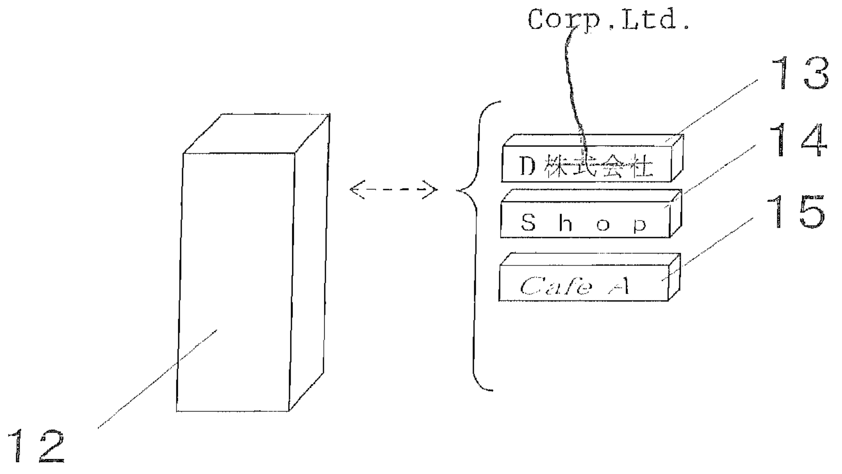
FIG. 4 illustrates the association between a three-dimensional object and the sign object.

FIG. 4 shows examples of sign objects 13 through 15 for tenants in a building (three-dimensional object). For example, the sign object 13 shows a horizontal display for "D Corp. Ltd.", but other displays such as vertical displays and simplified displays, e.g., "D" are also prepared. Similarly, vertical, horizontal, and simplified displays and the like are prepared for the sign objects 14 and 15, and these are associated with their respective floors in the three-dimensional object.

When a three-dimensional object is displayed, sign object formats are selected out of the vertical, horizontal, and simplified displays, scaling of sizes will be performed, and priority sequencing of the sign objects 13 through 15 will be taken into account so that there will not be overlapping on the three-dimensional object. These sign objects are displayed on the determined positions of the three-dimensional object 12. Thus, in FIG. 3, the sign objects 7 and 8 are displayed as the selected sign objects 7 and 8.

Figure 5:
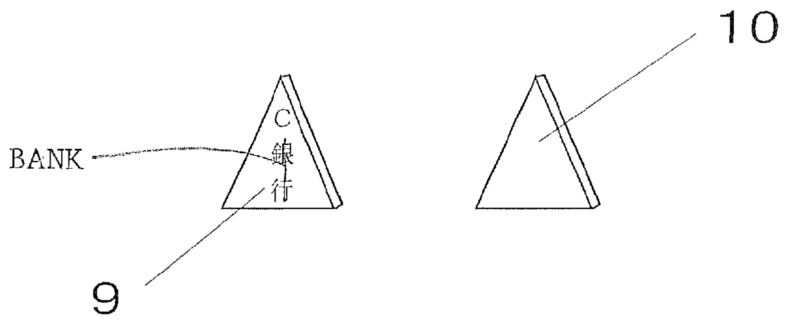
FIG. 5 illustrates a display of multiple sign data for a sign object.

FIG. 5 shows examples of sign data displays for a sign object. When a sign data 9 is displayed, a display indicating "Bank C" is displayed in a triangle. When a sign data 10 is displayed, there is no text in the triangle. However, if a triangle is sufficiently identifiable as a sign object for Bank C, the displaying of the sign data 10 is sufficient. Furthermore, although colors are not indicated in the figure, if a triangle does not provide sufficient identification or even if it is, if "orange" provides identifiability as a "house color" or if the combination of a triangle and the color provide sufficient identification, then it would be possible for the multiple sets of sign data to include sign data with combinations of a triangle and/or a color.

Figure 6:
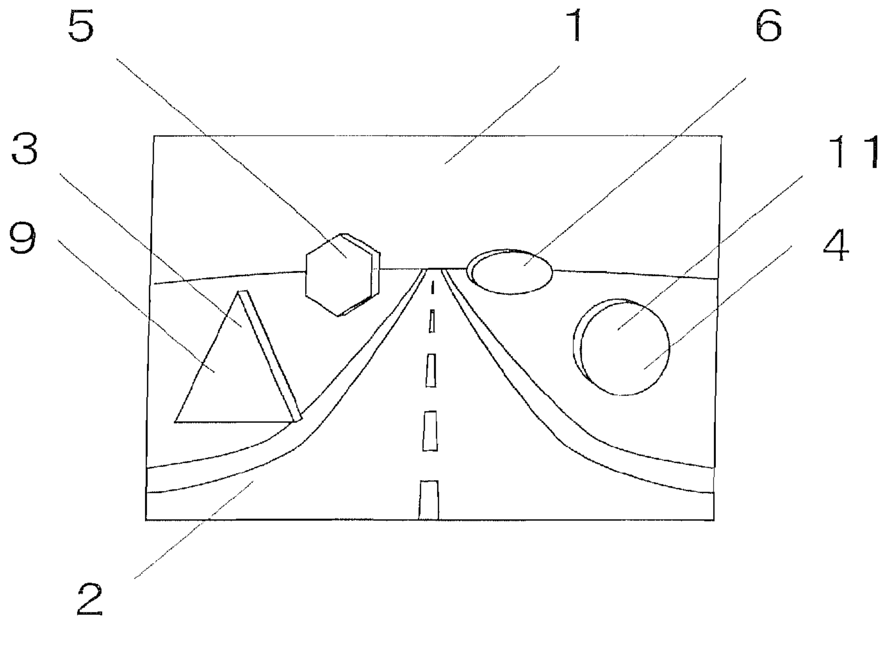
FIG. 6 illustrates a display with multiple sign data for a sign object.

If there is sufficient identifiability in a combination of a logo and/or a color, the multiple sets of sign data for a sign object can include the logo and/or color. FIG. 6 shows another example of the present invention showing a logo display in which only logos, shapes, and the like are displayed at appropriate positions on the three-dimensional object street 2. Even if three-dimensional objects such as buildings are not displayed, the positions of destinations can be displayed to the viewer in a three-dimensional manner.

Thus, multiple sets of sign data are first prepared for sign objects that can be shared between different locations, e.g., for banks, convenience stores, department stores, discount shops, fast food stores, restaurants, and the like. Similarly, multiple sets of data can also be prepared for notable sites in specific regions. If the sign data contains logos and shapes and the like that would result in overlapping or too much complexity in the overall display, a simplified display, e.g., a logo, is selected.

By associating a priority sequence with the prepared sign data, it would be possible to select sign data that would not be displayed in certain cases. For the sign data described above that can be shared between different regions, there is no need to prepare multiple sets. Since the data can be shared, the size of the data can be reduced.

Apart from the sign data, it would be possible to prepare CG displays with simplified three-dimensional objects and it would also be possible to prepare CG displays. Since this is already being done with CG, this can be omitted and the sign objects described above can be associated (links can be set up) with the three-dimensional objects in order to set up the association with the sign data. When doing this, an association is made with an attribute of the three-dimensional object, e.g., there is an association between a sign object and the floor level of a three-dimensional object.

For example, when a search is made for a bank at a certain location and the display in FIG. 3 is shown and the display for the bank is the sign object 7, the sign object 7 can be made prominent by not displaying the sign object 8. Detection of overlaps between sign objects can be performed according to the method described in Patent Document 1.

Also, when the display in FIG. 3 is shown and a GPS signal detects a change in the direction of the viewer, the display orientation of FIG. 3 changes and display of three-dimensional objects changes. In such cases, the sign objects 7 and 8 are displayed so that they are directly facing die orientation of the viewer, thus allowing ease of identification to be maintained. In the case of a photorealistic display, oblique displays can decrease ease of identification.

In the present invention as described above, creation time can be reduced, responsiveness of the display can be improved, and the need to change sign objects can be eliminated. In maintenance operations, changes will be performed often only on the three-dimensional objects, thus making maintenance easier.

REFERENCE CHARACTERS

1: three-dimensional display screen
2: street
3: building
7: sign object

The invention claimed is:

1. A sign object presentation device for a navigation system comprising:

means for selecting object data for a three-dimensional object which includes presentation information and is a three-dimensional architectural object of a building or a monument;

means for preparing multiple sets of sign data for one or more sign objects that can be shared between different locations;

means for linking the object data with a plurality of simplified sign data of a sign object, which simplified sign data are obtained by simplifying ordinary sign data so as to simplify and capture the characteristics of the sign object to make viewing, by the user, easier and quicker; and simultaneously to provides better and precise individual identification of the sign object and the three-dimensional object, the ordinary sign data being an advertisement, or a color logo and shape either singly or in combination;

means for selecting suitable sign data based on presentation information for when the object data is displayed on the presentation device;

wherein presentation information comprises of: the size of the three-dimensional object, a viewing direction and information about overlapping of sign objects;

information about overlapping of sign objects comprising of:

means for determining if the sign data contains one or more logos and one or more shapes that when rendered on the device resulted in overlapping of one or more sign objects in the overall display and means for preventing overlapping on the three-dimensional object by scaling of sizes for sign objects and priority sequencing of sign objects;

means for selecting proper simplified sign data out of the plurality of simplified sign data based on the presentation information for said object data;

means for displaying the three-dimensional object with the selected simplified sign data together with the sign object located at a predetermined position of the three-dimensional object whereby a viewer can more easily, more quickly and more precisely identify the sign object and the three-dimensional object and means for increasing display speed of the presentation device by displaying simplified sign data based upon the collective data volume of simplified sign data.

2. The sign object presentation device according to claim 1, further comprising:

means for keeping the selected simplified sign data facing forward at all times, the means for keeping the selected simplified sign data facing forward displaying the sign object surface perpendicular or substantially perpendicular to the viewing direction of the navigation system display.

3. The sign object presentation device according to claim 1 further comprising:

means for selecting the sign object based on search information and selecting the simplified sign data out of the plurality of simplified sign data based on presentation information for the three-dimensional object data to which and on which the sign object is attached and displayed.

4. The sign object presentation device according to claim 1 further comprising means for displaying without overlapping when such overlapping is caused by a plurality of the three-dimensional objects, a plurality of the sign data displayed in association with the three-dimensional object or a plurality of the three-dimensional objects and the plurality of sign data.

5. The sign object presentation device according to claim 1, wherein the simplified sign data comprises at least one of a logo, color, texture, a picture and name of the business that occupies the location corresponding to the three-dimensional architectural object of the building or monument.

* * * * *